United States Patent Office 3,427,330
Patented Feb. 11, 1969

3,427,330
ACYLTHIOALKYLTHIOENOL ETHERS AND METHOD OF PREPARATION
George Karmas, Bound Brook, N.J., assignor to Ortho Pharmaceutical Corporation, a corporation of New Jersey
No Drawing. Filed Jan. 31, 1964, Ser. No. 341,762
U.S. Cl. 260—397.3    17 Claims
Int. Cl. C07c 167/36, 167/30, 173/00

This invention relates to a novel process involving cyclic thioketals. More particularly, it is concerned with non-reductive cleavages of cyclic thioketals.

A recurring problem in steroid chemistry is the protection of carbonyl groups through the intervention of a suitable derivative from which the ketone may be regenerated. Well known methods of protection include the formation of ketals, hemithioketals, enamines, enol esters, enol ethers and enol thioethers.

One of the most readily formed general derivatives of ketones is the ethylene thioketal. However, the only reported reactions of ethylene thioketals have been oxidation to sulfoxides and sulfones, complete reductive removal or direct hydrolysis to ketones. The ethylene thioketals have been considered among the most stable of ketone derivatives and until now no non-reductive openings have been reported.

It is an object of the present invention to provide a new method for the regeneration of protected carbonyl groups.

Another object is to provide a novel process of acylative cleavage.

Another object is to provide novel acylthioalkylthioenol ethers.

Other objects will be apparent from the detailed description of the invention provided hereinafter.

Carbonyl groups are highly reactive and are often altered during chemical reactions. Typical of this is the reaction of a Grignard reagent with a ketone to form a carbinol. By protecting the carbonyl group, the Grignard reagent will not react at this site.

It has been found that the carbonyl group can be protected prior to other reactions by converting it to a thioketal and subsequently regenerating the carbonyl group. The sequence of this protective method may be represented as follows:

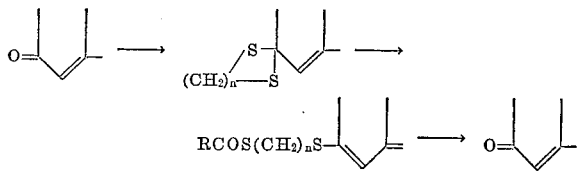

While the reaction sequence illustrated shows the 3-one of the steroid molecule, carbonyl groups at any position in a steroid may be converted to the thioketal and the novel acylthioalkylthioenol ether and be subsequently regenerated. Functional groups present at other positions of the thioketal molecule will be unaffected by the acylative cleavage as long as they are stable to the conditions of acylation with an acid catalyst.

A thioketal may be formed from almost any type of ketone by reacting the ketone with an alkyldithiol, such as ethanedithiol, 1,2-propanedithiol, 1,3-propanedithiol, etc. To a mixture of the ketone and the alkyldithiol is added, with or without a non-reactive diluent, an acid of the Lewis acid type, such as hydrogen chloride, hydrogen bromide, boron trifluoride etherate, etc. The distinctive characteristic of such a thioketal is that its infrared spectrum becomes devoid of the typical carbonyl bands in the region 5.7–6.2µ which had been displayed by its precursor ketone. The reaction may be illustrated as:

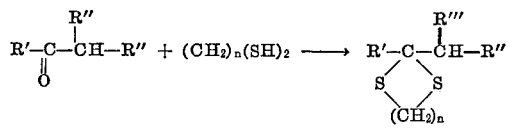

wherein R' and R'' may be substituted or unsubstituted, saturated or unsaturated alkyl or aryl radical, R'' may also be hydrogen, R' and R'', taken together may be a ring system and R''' may be hydrogen, a halide, a substituted or unsubstituted, saturated or unsaturated alkyl or aryl radical and n is the integer 2 or 3.

The acylthioalkylthioenol ether is converted to the parent ketone upon mild acid hydrolysis.

The cleavage of the thioketal may be considered as the scission of one of the carbon to sulfur bonds of a cyclic thioketal, with simultaneous acylation and enolization. This reaction may be represented as follows:

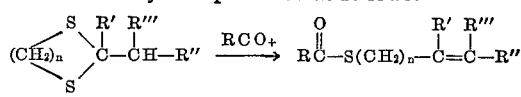

wherein R may be a hydrocarbon having from 1 to 6 carbon atoms, R' and R'' may be substituted or unsubstituted, saturated or unsaturated, alkyl or aryl radical, R'' may also be hydrogen, R' and R'', taken together may be a ring system, R''' may be hydrogen, a halide, a substituted or unsubstituted, saturated or unsaturated alkyl or aryl radical and n is the integer 2 or 3.

This reaction occurs readily when the thioketal is treated with a mixture of a carboxylic acid and trifluoroacetic anhydride, or a carbonyl halide or carboxylic anhydride in the presence of a strong acid. Any strong acid may serve as the catalyst. Acids which have been found to be particularly effective are toluenesulfonic acid, trichloroacetic acid, trifluoroacetic acid, boron trifluoride etherate and hydrogen chloride.

Typical carboxylic acids which may be used are acetic acid, propionic acid, n-butyric acid, isobutyric acid, n-valeric acid, trimethylacetic acid, caproic acid, hexanoic acid, cyclopropanecarboxylic acid and benzoic acid. Typical carbonyl halides which may be used are acetyl chloride, acetyl bromide, butyryl bromide, butyryl chloride, propionyl bromide, propionyl chloride, propionyl iodide, isobutyryl bromide, isobutyryl chloride, benzoyl bromide, benzoyl chloride and benzoyl iodide. Typical carboxylic anhydrides which may be used are acetic anhydride, propionic anhydride, butyric anhydride, isobutyric anhydride valeric anhydride, hexanoic anhydride and benzoic anhydride.

The novel acylthioalkylthioenol ethers of this invention have utility as intermediates in the preparation of known compounds.

The following examples will further illustrate the invention:

EXAMPLE I

17α-ethynyltestosterone acetate 3-ethylenethioketal

A mixture of 9.2 g. of 17α-ethynyltestosterone acetate, 7 ml. of ethanedithiol, and 7 g. of pyridine hydrochloride in 35 ml. of methanol is stirred vigorously at 25° C. for two hours and then at 0° C. for one-half hour. The methanol-insoluble granular white solid is filtered off, washed with methanol and dried in air to afford 10.4 g. of almost pure 17α-ethynyltestosterone acetate 3-ethylenethioketal. An analytical sample prepared by recrystallization from acetone melts at 255–259° C.

*Analysis.*—Calcd. for $C_{25}H_{34}O_2S_2$: C, 69.77; H, 7.96. Found: C, 69.84; H, 8.09.

λλ Max.: 3.02, 5.73, 7.98, 8.12, 11.53, 11.68, 11.81µ.

EXAMPLE II

17α-ethynyl-19-nortestosterone acetate, 3-ethylenethioketal

A solution of 9.3 g. of 17α-ethynyl-19-nortestosterone acetate, 7 ml. of ethanedithiol, and 8 g. of pyridine hydrochloride in 140 ml. of methanol is stirred at 25° C. for ninety minutes and then it is stored at 0° C. for eighteen hours. Filtration affords 10.0 g. of fine white prisms of 17α-ethynyl-19-nortestosterone acetate 3-ethylenethioketal which melts at 211–214° C.

Analysis.—Calcd. for $C_{24}H_{32}O_2S_2$: C, 69.21; H, 7.74. Found: C, 69.19; H, 7.80.

λλ Max.: 3.02, 5.77, 7.92, 8.02, 8.11μ.

EXAMPLE III

6α-methyl-17α-hydroxyprogesterone acetate 3-propylenethioketal

A solution of 10.2 g. of 6α-methyl-17αhydroxyprogesterone acetate and 10 ml. of 1,3-propanedithiol in 18 ml. of methylene chloride is stirred at 0° C. and 10 ml. of boron trifluoride etherate is added in one portion. After five minutes, 100 ml. of methanol is added to the reaction mixture and stirring is continued for an additional thirty minutes at 0°. The crude thioketal is isolated by filtration and is recrystallized from acetone to afford pure 6α-methyl-17α-hydroxyprogesterone acetate -3-propylenethioketal of melting point 247—252° C.

Analysis.—Calcd. for $C_{27}H_{40}O_3S_2$: C, 68.10; H, 8.46. Found: C, 67.86; H, 8.34.

λλ Max.: 5.76, 5.83, 7.92, 8.00, 11.58μ.

EXAMPLE IV

6-methyldehydroisoandrosterone acetate 17-ethylene thioketal

To a solution of 2.3 g. of 6-methyldehydroisoandrosterone in 23 ml. of acetic acid is added 2.3 ml. of ethanedithiol, followed by 2.3 ml. of boron trifluoride etherate and the mixture is stirred vigorously at 25° C. for five minutes and then is diluted with 40 ml. of methanol. The resulting slurry is stirred at 0° C. for thirty minutes and then it is filtered to isolate 2.5 g. of 6-methyl-dehydroisoandrosterone acetate 17-ethylenethioketal, fine white prisms which melt at 156–158°. As isolated, this thioketal is of high enough purity for further transformations. An analytical sample, recrystallized from hexane, melted at 160–161°.

Analysis.—Calcd. for $C_{24}H_{36}O_2S_2$: C, 68.60; H, 8.62. Found: C, 68.83; H, 8.34.

λλ Max.: 5.77, 8.00, 9.61, 11.08μ.

EXAMPLE V

3-(β-acetylthioethylthio)-17α-ethynyl-17β-acetoxy-androsta-3,5-diene

A mixture of 1.0 g. of 17α-ethynyltestosterone acetate 3-ethylenethioketal, 5 ml. of acetic acid, 3 ml. of methylene chloride, and 3 ml. of trifluoroacetic anhydride is stirred at 25° C. for thirty minutes and then the red solution is poured into 200 ml. of water. After neutralization with sodium bicarbonate, this mixture is extracted with three small portions of methylene chloride. The residue obtained by evaporation of the methylene chloride solution is recrystallized from ether to afford 0.95 g. of 3-(β-acetylthioethylthio) - 17α - ethynyl - 17β - acetoxy-androsta-3,5-diene, pale yellow prisms which melt at 130–131°.

Analysis.—Calcd. for $C_{27}H_{36}O_3S_2$: C, 68.66; H, 7.68. Found: C, 68.77; H, 7.77.

λλ Max.: 232, 270 mμ; 3.08, 5.79, 5.92, 6.25, 8.80μ.

EXAMPLE VI

3-(β-propionylthioethylthio)-6-methyl-17α-acetoxy-pregna-3,5-dien-20-one

A mixture of 1.0 of 6α-methyl-7α-acetoxyprogesterone 3-ethylenethioketal, 10 ml. of propionic acid and 5 ml. of trifluoroacetic anhydride is stirred at 25° C. for ten minutes and is then poured into 300 ml. of water. This mixture is stirred and neutralized with sodium bicarbonate, and then it is extracted with two portions of ethyl ether. The residue from evaporation of the ether solution is developed on a chromatographic column of neutral alumina. Elution with ether-hexane affords 0.6 g. of 3-(β-propionylthioethylthio)-6-methyl-17α-acetoxy-pregna-3,5-dien-20-one as a pale yellow viscous oil which is spectrally identical with the material obtained in Example XIII.

EXAMPLE VII

3-(β-cyclopropylcarbonylthioethylthio)-6-methyl-17α-acetoxypregna-3,5-dien-20-one A mixture of 2.0 g. of 6α-methyl-17α-acetoxy-progesterones 3-ethylenethioketal, 7 ml. of cyclopropanecarboxylic acid, and 3.5 ml. of trifluoroacetic anhydride is stirred at 25° C. for fifteen minutes and then poured into 350 ml. of water. After neutralization with sodium bicarbonate, this mixture is extracted with two 75 ml. portions of ether. The residue obtained by evaporation of the ether solution is developed on a chromatographic column of neutral alumina. Elution with ether-hexane affords 1.7 g. of a colorless viscous oil which solidifies on standing and is recrystallized from methanol to afford 1.4 g. of 3-(β-cyclopropylcarbonylthioethylthio)-6-methyl-17α-acetoxypregna-3,5-dien-20-one, pale yellow prisms which melt at 92–94°.

Analysis.—Calcd. for $C_{30}H_{42}O_4S_2$: C, 67.85; H, 7.98. Found: C, 67.88; H, 8.01.

λλ Max.: 234, 277 mμ; 5.78, 5.82, 5.95, 6.25, 8.88μ.

EXAMPLE VIII

3-(β-acetylthioethylthio)-pregna-3,5-dien-20-one

A mixture of 3.0 g. of progesterone 3-ethylenethioketal and 1.5 g. of p-toluenesulfonic acid in 55 ml. of acetic acid plus 25 ml. of acetic anhydride is stirred at 20° for ten minutes and then allowed to stand at 20° C. for ten hours. The clear red solution is then poured into 750 ml. of water and after stirring to hydrolyze acetic anhydride the mixture is neutralized with sodium bicarbonate and extracted with three small portions of methylene chloride. After drying and concentration under vacuum the methylene chloride residue is recrystallized from ether-methanol to afford 2.0 g. of 3-(β-acetylthioethylthio)-pregna-3,5-dien-2-one as pale yellow flakes of melting point 79–80°.

Analysis.—Calcd. for $C_{25}H_{36}O_2S_2$: C, 69.44; H, 8.39. Found: C, 69.69; H, 8.28.

λλ Max.: 233, 269 mμ; 5.90, 6.29, 8.80μ.

EXAMPLE IX

3-(β-acetylthioethylthio)-6-methyl-17-α - acetoxypregna-3,5-dien-20-one

A mixture of 2.0 g. of 6α-methyl-17α-acetoxyprogesterone 3-ethylenethioketal, 1.0 g. of trichloroacetic acid, 20 ml. of acetic acid, and 10 ml. of acetic anhydride is heated at 80° C. for 3½ hours. The clear red solution is poured into 300 ml. of water and subsequently neutralized with sodium bicarbonate, after which the product is extracted with three small portions of methylene chloride. The solid residue obtained on evaporation of the methylene chloride solution is recrystallized from ether to afford 1.5 g. of 3-(β - acetylthioethylthio) - 6 - methyl-17α-acetoxypregna-3,5-dien-20-one as yellow prisms of melting point 134–135°.

*Analysis.*—Calcd. for C₂₈H₄₀O₄S₂: C, 66.60; H, 7.98. Found: C, 66.44; H, 8.09.

λλ Max.: 235, 276 mμ; 5.76, 5.82, 5.90, 6.25, 8.77μ.

EXAMPLE X

3 - (β - acetylthioethylthio)-6-methyl-17α-acetoxypregna-3,5-dien-20-one

A mixture of 2.0 g. of 6α-methyl-17α-acetoxyprogresterone 3-ethylenethioketal, 4 ml. of trifluoroacetic acid, 20 ml. of acetic acid, and 10 ml. of acetic anhydride is heated at 80° C. for fifteen minutes and then poured into 300 ml. of water. This mixture is stirred and neutralized with sodium bicarbonate and then extracted with three small portions of methylene chloride. The methylene chloride residue is recrystallized from ether to afford 1.85 g. of 3-(β - acetylthioethylthio) - 6 - methyl-17α-acetoxypregna-3,5-dien-20-one of melting point 134–135°, identical in all respects with the product described in Example IX.

EXAMPLE XI

3 - (β-acetylthioethylthio)-6-methyl-17α-acetoxy-pregna-3,5-dien-20-one

A mixture of 1.0 g. of 6α-methyl-17α-acetoxy-progesterone 3-ethylenethioketal, 6 ml. of acetic anhydride and 10 ml. of 0.68 N hydrogen chloride-in-ether is stirred at 30° C. for seven days. The clear orange solution is poured into 400 ml. of water and this mixture is neutralized with sodium bicarbonate, after which the product is removed by filtration. The orange solid product is dissolved in 50 ml. of methylene chloride, dried with anhydrous magnesium sulfate and the filtered solution is evaporated to a viscous orange oil. This oil is dissolved in 20 ml. of warm ether and the solution is boiled down to a volume of 5 ml. Chilling of this ether solution at 0° C. affords 0.8 g. of 3-(β-acetylthioethylthio)-6-methyl - 17α - acetoxypregna-3,5-dien-20-one as pale orange prisms which melt at 135–136°. This material is identical with the product described in Example IX.

EXAMPLE XII 3-(γ-acetylthiopropylthio) - 6-methyl-17α-acetoxypregna-3,5-dien-20-one A mixture of 2.65 g. of 6α-methyl-17α-acetoxy-progesterone 3-propylenethioketal, 50 ml. of acetic acid, 20 ml. of acetic anhydride and 5 ml. of boron trifluoride etherate is stirred at 20° C. for twelve minutes and then poured into 750 ml. of cold water. This mixture is neutralized with sodium bicarbonate and then extracted with three small portions of methylene chloride. The residue from evaporation of the methylene chloride solution is recrystallized from ether-methanol to afford 2.4 g. of 3-(γ-acetylthiopropylthio)-6 - methyl-17α-acetoxypregna-3,5-dien-20-one as cream granules of melting point 100–101°.

*Analysis.*—Calcd. for C₂₉H₄₂O₄S₂: C, 67.16; H, 8.16. Found: C, 67.30; H, 8.36.

λλ Max.: 234, 276 mμ; 5.77, 5.84, 5.92, 6.28, 8.82μ.

EXAMPLE XIII

3 - (β - propionylthioethylthio) - 6-methyl-17α-acetoxypregna-3,5-dien-20-one

A mixture of 1.0 g. of 6α-methyl-17α-acetoxyprogesterone 3-ethylenethioketal, 5 ml. of propionic anhydride and 0.5 ml. of boron trifluoride etherate is stirred at 25° C. for seven minutes and is then poured into 200 ml. of water. This mixture is stirred and neutralized with sodium bicarbonate and then extracted with two portions of ethyl ether. The residue from concentration of the ether solution is developed on a chromatographic column of neutral alumina. Elution with ether-hexane affords 0.7 g. of a very pale yellow viscous oil which is 3-(β-propionylthioethylthio)-6-methyl-17α-acetoxypregna-3,5-dien-20-one.

*Analysis.*—Calcd. for C₂₉H₄₂O₄S₂: C, 67.16; H, 8.16. Found: C, 66.92; H, 8.16.

λλ Max.: 234, 275 mμ; 5.76, 5.81, 5.88, 6.25, 8.88μ.

EXAMPLE XIV

3 - (β - hexanoylthioethylthio) - 6-methyl-117α-acetoxypregna-3,5-dien-20-one

A mixture of 1.0 g. of 6α-methyl-17α-acetoxy-progesterone 3-ethylenethioketal, 5 ml. of hexanoic anhydride and 0.5 ml. of boron trifluoride etherate is stirred at 25° C. for ten minutes and is then poured into 200 ml. of water. This mixture is stirred and neutralized with sodium bicarbonate and then extracted with two portions of pentane. The residue from concentration of the pentane solution is developed on a chromatographic column of neutral alumina. Elution with ether-hexane affords 0.6 g. of a very pale yellow viscous oil which is 3-(β-hexanoylthioethylthio)-6-methyl-17α-acetoxy-pregna - 3,5 - dien-20-one.

*Analysis.*—Calcd. for C₃₂H₄₈O₄S₂: C, 68.52; H, 7.19. Found: C, 68.83; H, 7.83.

λλ Max.: 234, 277 mμ; 5.75, 5.81, 5.90, 6.25, 8.88μ.

EXAMPLE XV 3-(β-benzoylthioethylthio)-6-methyl-17-acetoxypregna-3,5-dien-20-one A mixture of 20 g. of 6α-methyl-17α-acetoxyprogesterone 3-ethylenethioketal, 5 ml. of methylene chloride, 5 ml. of ethyl ether, 2 g. of benzoic anhydride, and 2 ml. of boron trifluoride etherate is stirred at 25° C. for two and one-half hours, and then the clear green solution is poured into 300 ml. of water. After neutralization with sodium bicarbonate, this mixture is extracted with three small portions of methylene chloride. The residue obtained by evaporation of the methylene chloride solution is recrystallized from methylene chloride-methanol to afford 1.6 g. of 3-(β-benzoylthioethylthio)-6-methyl-17α-acetoxypregna-3,5-dien-20-one as pale yellow prisms of melting point 139–140°.

*Analysis.*—Calcd. for C₃₂H₄₂O₄S₂: C, 69.27; H, 7.63. Found: C, 69.35, H, 7.57.

λλ Max.: 239, 273 mμ; 5.78, 5.83; 6.00, 6.28, 6.33, 8.90, 11.00, 12.80, 14.55, 15.42μ.

EXAMPLE XVI 3-(β-acetylthioethlythio)-6-methyl-17α-acetoxypregna-3,5-dien-20-one A mixture of 2.0 g. of 6α-methyl-17α-acetoxyprogesterone 3-ethylenethioketal, 5 ml. of methylene chloride, 5 ml. of ethyl ether, 2 ml. of acetyl chloride, and 2 ml. of boron trifluoride etherate is stirred at 25° C. for one hour and the resulting clear solution is poured into 200 ml. of cold water. After neutralizing with sodium bicarbonate, the aqueous mixture is extracted with three small portions of methylene chloride. The residue from evaporation of the methylene chloride solution is recrystallized from ether to afford 1.8 g. of 3-(β-acetylthioethylthio)-6-methyl-17α-acetoxypregna-3,5-dien-20-one as pale yellow prisms of melting point 134–135°, identical in all respects with the product described in Example IX.

EXAMPLE XVII 3-(β-benzoylthioethylthio)-6-methyl-17α-acetoxypregna-3,5-dien-20-one A mixture of 2.0 g. of 6α-methyl-17α-acetoxyprogesterone 3-ethylenethioketal, 5 ml. of methylene chloride, 5 ml. of ethyl ether, 2 ml. of benzoyl chloride, and 2 ml. of boron trifluoride etherate is stirred at 25° C. for thirty hours and then the clear yellow-green solution is poured into 200 ml. of cold water. After neutralization with sodium bicarbonate, this mixture is extracted with three small portions of methylene chloride. This residue obtained by evaporation of the methylene chloride solution is recrystallized from methylene chloride-methanol to afford 2.0 g. of 3-(β-benzoylthioethylthio)-6-methyl-17α-acetoxypregna-3,5-dien-20-one as fine yellow prisms of melting point 138–140. This is identical in all respects with the product described in Example XV.

EXAMPLE XVIII

3β-acetoxy-17-(β-acetylthioethylthio) androsta-5,16-diene

A mixture of 5.0 g. of dehydroepiandrosterone acetate 17-ethylenethioketal, 10 ml. of acetic acid, and 10 ml. of trifluoroacetic anhydride is stirred vigorously, without external cooling, for fifteen minutes and then it is poured into 400 ml. of water. After stirring and neutralizing with sodium bicarbonate, the mixture is extracted with three small portions of methylene chloride. The oily brown residue which is obtained by concentration of the methylene chloride solution is leached at 20° with 50 ml. of ethyl ether and filtered. The filtrate is concentrated to a volume of 15 ml. and developed on a chromatographic column of neutral alumina. Elution with 25% ether–75% pentane affords a small amount of recovered unreacted thioketal. This is followed by elution with 50% ether–50% pentane to afford 1.0 g. of 3β-acetoxy-17-(β-acetylthioethylthio) androsta-5,16-diene as a yellow viscous oil.

Analysis.—Calcd. for $C_{25}H_{36}O_3S_2$: C, 66.98; H, 8.09. Found: C, 67.56; H, 8.27.

λλ Max.: 230 mμ; 5.78, 5.90, 8.80μ.

EXAMPLE XIX

3β-acetoxy-16-(β-acetylthioethylthio) androsta-5,15 (or 16)-diene

A suspension of 1.0 g. of 3β-acetoxyandrost-5-ene-16-one 16-ethylenethioketal in 5 ml. of acetic acid and 5 ml. of trifluoroacetic anhydride is heated at 70–75° for fifteen minutes and is then poured into 150 ml. of water. After neutralization with sodium bicarbonate, this hydrolysis mixture is extracted with two 50 ml. portions of ether. The residue obtained by evaporation of the ether solution is developed on a chromatographic column of acidic alumina. Elution with benzene-hexane affords 0.7 g. of 3β-acetoxy-16-(β-acetylthioethylthio) androsta-5,15 (or 16)-diene as a pale yellow viscous oil.

Analysis.—Calcd. for $C_{25}H_{36}O_3S_2$: C, 66.98; H, 8.09. Found: C, 69.49; H, 8.39.

λλ Max.: 228 mμ; 5.79, 5.91, 8.01, 8.80, 9.67, 11.03, 12.23μ.

EXAMPLE XX 3-(β-acetylthioethylthio)-17α-ethynyl-17β-acetoxyestra-3,5-diene

A mixture of 2.0 g. of 17α-ethynyl-19-nortestosterone acetate 3-ethylenethioketal, 10 ml. of acetic anhydride, and 2 ml. of trifluoroacetic acid is stirred at 25° C. for ten minutes and is then poured into 200 g. of ice and water. After neutralization with sodium bicarbonate, the oily product is extracted from the hydrolysis mixture with methylene chloride. The residue obtained on evaporation of the methylene chloride is developed onto a chromatographic column of acidic alumina. Elution with ether-hexane affords 1.6 g. of 3-(β-acetylthio-ethylthio)-17α-ethynyl-17β-acetoxyestra-3,5-diene as a viscous, pale yellow oil.

Analysis.—Calcd. for $C_{26}H_{34}O_3S_2$: C, 68.14; H, 7.48. Found: C, 66.04; H, 7.31.

λλ Max.: 234, 272mμ; 3.02, 5.72, 5.91, 6.23, 8.80μ.

The two following examples illustrate the preparation of acylthioalkylthioenol ethers from non-steroidal thioketals.

EXAMPLE XXI

α-(β-acetylthioethylthio)-styrene

To a solution of 1.3 g. of acetophenone ethylenethioketal in 5 ml. of acetic anhydride is added 1 ml. of trifluoroacetic acid. After three minutes at 25° C., the red solution is poured into 100 ml. of water, and then subsequent to neutralization with sodium bicarbonate the oily product is extracted with two 25 ml. portions of ether. The residue obtained by evaporation of the ether solution is distilled under vacuum to afford 0.7 g. of α-(β-acetylthioethylthio)-styrene as a pale yellow mobile oil which distills at 110–130°/0.1 mm. and has $n_D^{23}$ 1.5961.

Analysis.—Calcd. for $C_{12}H_{14}OS_2$: C, 60.41; H, 5.92. Found: C, 58.12; H, 5.91.

λλ Max.: 235, 265 mμ; 5.90, 6.28, 6.35, 8.80, 10.40, 12.93, 14.28μ.

EXAMPLE XXII

β-Acetylthioethylthiocyclohexene-1

A solution of 27.1 g. of cyclohexanone ethylenethioketal, 250 ml. of acetic acid, 125 ml. of acetic anhydride, and 25 ml. boron trifluoride etherate is maintained at 25° C. for ninety minutes and then it is poured into 2 liters of stirred ice plus water. After being stirred for forty-five minutes, the hydrolysis mixture is extracted with two 200 ml. portions of pentane. The combined pentane solution is washed with water and aqueous sodium bicarbonate, dried, and evaporated. The residual pale yellow oil is a mixture of products and unreacted starting material, which upon careful fractional distillation affords β-acetylthioethylthiocyclohexene-1 as a straw-colored, mobile oil which boils at 88–93° at 0.1 mm. of mercury pressure and has $n_D^{23}$ 1.5563.

Analysis.—Calcd. for $C_{10}H_{16}OS_2$: C, 55.44; H, 7.45. Found: C, 55.50; H, 7.46.

λλ Max.: 229 mμ; 5.9, 8.8, 11.8, 12.4, 13.6μ.

Other non-steroidal acylthioalylthioenol ethers are prepared by opening the thioketal in the same manner. Illustrative are:

| Thioketal | Acylthioalkylthioenol ether |
| --- | --- |
| Acetone-ethylenethioketal | 2-(β-acetylthioethylthio)-propene |
| Desoxybenzoin ethylenethioketal | α-(β-acetylthioethylthio)-stilbene |
| Diethyl ketone ethylenethioketal | 3-(β-acetylthioethylthio)-pentene-2 |

EXAMPLE XXIII 3-(β-acetylthioethylthio)-17α-methyl-17β-acetoxyandrost-3,5-diene To a solution of 4.1 g. of 17α-methyltestosterone acetate 3-ethylenethioketal in 8 ml. of methylene chloride is added 21.5 ml. of acetic acid and 9 ml. of trifluoroacetic anhydride. After being held at 25° C. for seventy-five minutes, the dark red solution is held under vacuum briefly to remove the methylene chloride and then it is poured into 400 g. of ice and water. After neutralization of the hydrolysis mixture with sodium bicarbonate the tacky product is extracted with two 150 ml. portions of ether. The combined ether solution is dried with magnesium sulfate and is then boiled down to a volume of 20 ml. and stored at 0° C. to cause crystallization of 3-(β-acetylthioethylthio)-17α-methyl - 17β - acetoxyandrost-3,5-diene as pale yellow prisms (2.6 g.) which melt at 111–112° C.

Analysis.—Calcd. for $C_{26}H_{38}O_3S_2$: C, 67.54; H, 8.28. Found: C, 67.90; H, 8.42.

λλ Max.: 233, 268 mμ; 5.80, 5.91, 6.26, 8.83μ.

EXAMPLE XXIV

3β-acetoxy-6-methyl-17-(β-acetylthioethylthio) androsta-5,16-diene

A suspension of 1.0 g. of 6-methyldehydroisoandrosterone acetate 17-ethylenethioketal in 3 ml. of acetic acid is treated with 3 ml. of trifluoroacetic anhydride, added in one portion with stirring. After three minutes the resulting dark brown solution is poured into 100 ml. of ice and water and then the hydrolysis mixture is neutralized with sodium bicarbonate and extracted with two 30 ml. portions of ethyl ether. The residue obtained on evaporation of the ether is developed onto a chromatographic column of acidic alumina. Elution with 10% benzene-in-hexane affords the crude 17-thioenol ether as a tacky crystalline residue. Recrystallization from hexane yields 0.3 g. of 3β-acetoxy - 6 - methyl-17-(β-acetylthioethylthio) androsta-5,16-diene as yellow prisms which melt at 99–101°.

Analysis.—Calcd. for $C_{26}H_{38}O_3S_2$: C, 67.57; H, 8.28. Found: C, 67.55; H, 8.32.

λλ Max.: 5.72, 5.89, 8.00, 8.78, 9.59, 12.40μ.

In addition to the previously detailed examples, other thioketals have been opened using the general procedures already covered.

EXAMPLE XXV 3-(β-acetylthioethylthio)-17β-acetoxyandrost - (5α)-2-ene is obtained by the procedure of Example XII from dihydrotestosterone acetate 3-ethylenethioketal. It is a colorless viscous oil.

Analysis.—Calcd. for $C_{25}H_{38}O_3S_2$: C, 66.64; H, 8.50. Found: C, 67.00; H, 8.79.

λλ Max.: 227 mμ; 5.73, 5.88, 8.78μ.

EXAMPLE XXVI

3-β-acetoxy-20-(β - acetylthioethylthio) pregna - 5,17-(20)-diene is obtained by the procedure of Example V from pregnenolone acetate 20-ethylene-thioketal. It is a somewhat unstable colorless viscous oil.

Analysis.—Calcd. for $C_{27}H_{40}O_3S_2$: C, 68.39; H, 8.50. Found: C, 69.61; H, 8.70.

λλ Max.: 252 mμ; 5.73, 5.87, 8.78μ.

EXAMPLE XXVII 3-(β-acetylthioehtylthio)-4-chloro-17β - acetoxyandrosta-3,5-diene is obtained by the procedure of Example V from 4-chlorotestosterone 3-ethylenethioketal. It is isolated as white prisms which melt at 107–108°.

Analysis.—Calcd. for $C_{25}H_{35}O_3S_2Cl$: C, 62.20; H, 7.30. Found: C, 62.31; H, 7.30.

λλ Max.: 228, 278 mμ; 5.78, 5.90, 6.37, 8.81μ.

EXAMPLE XXVIII 3-(β - acetylthioethylthio)-17α-methyl - 17β - acetoxyandrosta-3,5-diene is obtained by the procedure of Example V from 17α-methyltestosterone acetate 3-ethylenethioketal. It is isolated as pale yellow prisms which melt at 117–118°.

Analysis.—Calcd. for $C_{26}H_{38}O_3S_2$: C, 67.54; H, 8.28. Found: C, 67.90; H, 8.42.

λλ Max.: 233, 268 mμ; 5.80, 5.91, 6.26, 8.83μ.

EXAMPLE XXIX 3-(β-acetylthioethylthio) androsta-3,5-diene-17-one is obtained by the procedure of Example XII from 4-androstene-3,17-dione 3-ethylenethioketal. It is isolated as pale yellow prisms which melt at 124–126°.

Analysis.—Calcd. for $C_{23}H_{32}O_2S_2$: C, 68.35; H, 7.98. Found: C, 68.56; H, 8.07.

λλ Max.: 230, 270 mμ; 5.78, 5.91, 6.24, 8.80μ.

EXAMPLE XXX 3-(β-acetylthioethylthio) cholesta-3,5-diene is obtained by the procedure of Example VIII from 4-cholestene-3-one 3-ethylenethioketal. It is isolated as a viscous pale yellow oil.

Analysis.—Calcd. for $C_{31}H_{50}OS_2$: C, 74.03; H, 10.02. Found: C, 73.26; H, 10.06.

λλ Max.: 232, 271 mμ; 5.90, 6.22, 8.79μ.

The following examples illustrate the use of acylthioalkylthioenol ethers as intermediates in the preparation of known steroids.

EXAMPLE XXXI

17α-methyltestosterone acetate 3-ethylenethioketal

A mixture of 5 g. of 4-androstene-3,17-dione 3-ethylenethioketal and 30 ml. of 3 M ethereal methylmagnesium bromide in 250 ml. of anhydrous benzene is stirred and heated under reflux for three hours and then it is chilled in ice and hydrolyzed in the customary manner with excess aqueous hydrochloric acid. The benzene phase is washed with water, dried with magnesium sulfate, and then evaporated to a solid residue. The latter is boiled under reflux in 60 ml. of acetic anhydride for forty-five minutes and this solution is then hydrolyzed in 400 g. of ice and water. The solid crude 17-acetate isolated by filtration is dried in air and is recrystallized from methylene chloride-methanol to afford 4.2 g. of white prisms of 17α-methyltestosterone acetate 3-ethylenethioketal which melt at 223–225° C. This material is identical with that which is obtained on formation of the 3-ethylenethioketal directly from 17α-methyltestosterone acetate.

Analysis.—Calcd. for $C_{24}H_{36}O_2S_2$: C, 68.60; H, 8.62. Found: C, 68.34; H, 8.53.

λλMax.: 5.81, 7.90, 11.19, 11.52, 11.70, 11.89, 12.04μ.

EXAMPLE XXXII

17α-methyltestosterone acetate

A mixture of 2.6 g. of 3-(β-acetylthioethylthio)-17α-methyl-17β-acetoxyandrost-3,5-diene, 250 ml. of methanol, 15 ml. of water, and 2 ml. of 12.5 N hydrochloric acid is boiled under reflux for three hours and then 100 ml. more water is added and the hydrolysis mixture is evaporated under vacuum until all the methanol has been removed. The solid product is isolated by filtration and then it is boiled under reflux in 50 ml. of acetic anhydride for twenty minutes and subsequently is hydrolyzed in 300 g. of ice and water. The solid is filtered off, dried in air and is recrystallized from methanol to afford 1.35 g. of 17α-methyltestosterone acetate which melts at 155–161° C. and is identical with material prepared by other methods.

The process of performing a Grignard reaction on 4-androstene-3,17-dione 3-ethylenethioketal, followed by acetylative opening to the thioenol ether, and acid hydrolysis of the latter to regenerate the Δ⁴-3-ketone constitutes a reaction sequence for the preparation of the pharmacologically useful 17α-methyltestosterone acetate.

EXAMPLE XXXIII

17α-ethynyltestosterone acetate

A mixture of 0.4 g. of 3-(β-acetylthioethylthio)-17α-ethnyl-17β-acetoxyandrosta-3,5-diene (Example V), 10 ml. of benzene, 100 ml. of methanol, 10 ml. of water and one ml. of 12.5 N hydrochloric acid is boiled under reflux for 2½ hours. After addition of 35 ml. of water the hydrolysis mixture is evaporated under vacuum to remove all solvents and the insoluble solid is filtered off and dried in air. It is then boiled under reflux in 20 ml. of acetic anhydride, after which this solution is hydrolyzed in 300 ml. of cold water. The white solid is filtered off, dried, and then recrystallized from ethyl ether to afford 0.25 g. of 17α-ethynyltestosterone acetate as white prisms which melt at 157–158° and are identical in all respects with the material of melting point 157–158° which is obtained by heating 17α-ethynyltestosterone in acetic anhydride.

λλMax.: 3.05, 5.75, 5.98, 6.19μ.

This example describes the conversion of the acylthioalkylthio ether of Example V to the ketone from which the thioketal of Example I was prepared, thus illustrating the manner in which a carbonyl group may be protected.

EXAMPLE XXXIV

17α-ethynyltestosterone acetate

To a stirred solution of 1.5 g. of 4-androstene-3,17-dione 3-ethylenethioketal in 50 ml. of dimethylformamide is added 5.0 g. of lithium acetylide-ethylenediamine complex (Foote Mineral Co.). A slow stream of acetylene gas is bubbled through the reaction mixture while it is stirred at 25° C. for three hours. Hydrolysis is effected by pouring onto 300 g. of ice. After dilution with water, the solid material is filtered off, dissolved in methylene chloride, dried, and concentrated to afford the crude ethynylcarbinol. The latter is boiled under reflux in 40 ml. of acetic anhydride and this solution is hydrolyzed in ice and water. Recrystallization of the solid thus obtained from acetone affords 1.25 g. of 17α-ethynyltestosterone acetate 3-ethylenethioketal as buff prisms which melt at 250–256° C. This material is identical with that which is obtained on formation of the 3-ethylenethioketal directly from 17α-ethynyltestosterone acetate.

*Analysis.*—Calcd. for $C_{25}H_{34}O_2S_2$: C, 69.77; H, 7.96. Found: C, 69.84; H, 8.09.

λλMax.: 3.02, 5.73, 7.98, 8.12, 11.53, 11.68, 11.81μ.

The process of this example, followed by acylative opening of the 3-thioketal (Example I) and hydrolysis of the resulting thioenol ether (Example XVI) constitutes a reaction sequence for the preparation of the pharmacologically useful 17α-ethynyltestosterone acetate from 4-androstene-3,17-dione.

Various changes and modifications in the procedure described herein will occur to those skilled in the art, and to the extent that such changes and modifications are embraced by the appended claims, it is understood that they constitute part of the invention.

What is claimed is:

1. A method of preparing acylthioalkylthioenol ethers which comprises treating a cyclic thioketal with a mixture selected from the group consisting of a hydrocarbon carboxylic anhydride and an acid catalyst, an acid halide, wherein the halide is selected from the group consisting of bromine, chlorine and iodine, and an acid catalyst, and a hydrocarbon carboxylic acid and trifluoroacetic anhydride.

2. A method of preparing acylthioalkylthioenol ethers which comprises treating a cyclic thioketal with a mixture of a hydrocarbon carboxylic anhydride and an acid catalyst.

3. A method according to claim 2 wherein the hydrocarbon carboxylic anhydride is selected from the group having an alkyl group of from 1 to 5 carbon atoms and phenyl, and the acid catalyst is selected from the group consisting of toluenesulfonic acid, trichloroacetic acid, trifluoroacetic acid, boron trifluoride etherate and hydrogen chloride.

4. A method of preparing acylthioalkylthioenol ethers which comprises treating a cyclic thioketal with a mixture of an acid halide, wherein the halide, is selected from the group consisting of bromine, chlorine and iodine, and an acid catalyst.

5. A method according to claim 4 wherein the acid halide is selected from the group having an alkyl group of from 1 to 5 carbon atoms and a phenyl group and the acid catalyst is selected from the group consisting of toluenesulfonic acid, trichloroacetic acid, trifluoroacetic acid, boron trifluoride etherate and hydrogen chloride.

6. A method of preparing acylthioalkylthioenol ethers which comprises treating a cyclic thioketal with a mixture of a hydrocarbon carboxylic acid and trifluoroacetic anhydride.

7. A method according to claim 6 wherein the hydrocarbon carboxylic acid is selected from the group having an alkyl group of from 1 to 5 carbon atoms and a phenyl group.

8. A compound selected from the group consisting of:

(I) 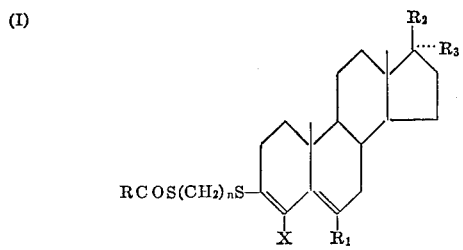

wherein R is selected from the group consisting of lower alkyl of from 1 to 5 carbon atoms, which may be saturated, straight chain, and branched chain and phenyl;

$R_1$ is selected from the group consisting of hydrogen and methyl;

$R_2$ is selected from the group consisting of acetyl, acetoxy, and lower alkyl of from 1 to 8 carbon atoms, which may be saturated, unsaturated, straight chain, branched chain and cyclic;

$R_3$ is selected from the group consisting of hydrogen, methyl, ethynyl and acetoxy;

$R_2$ and $R_3$, taken together, being oxygen;

X is selected from the group consisting of hydrogen, bromine, chlorine and iodine; and n is an integer from 2 to 3;

(II) 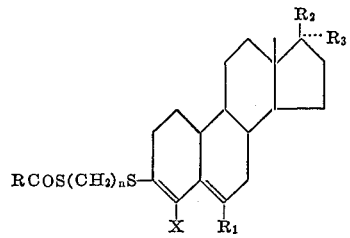

wherein R, $R_1$, $R_2$, $R_3$, X and n have the above designated meanings;

(III) 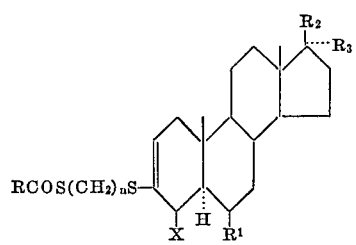

wherein R, $R_1$, $R_2$, $R_3$, X and n have the above designated meanings;

(IV) 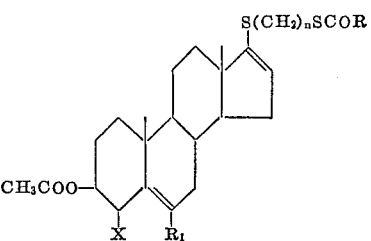

wherein R, $R_1$, X and n have the above designated meanings; and (V) 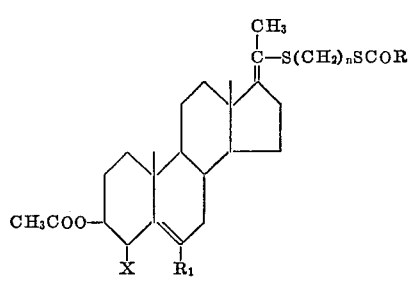

wherein R, $R_1$, X and n have the above designated meanings.

9. 3-(β-acetylthioethylthio)-17α-ethynyl-17β - acetoxyandrosta-3,5-diene.

10. 3-(β-acetylthioethylthio) pregna-3,5-diene-20-one.

11. 3-(β-acetylthioethylthio) - 6-methyl-17α - acetoxypregna-3,5-diene-20-one.

12. 3β - acetoxy-17 - (β-acetylthioethylthio) androsta-5,16-diene.

13. 3 - (β - acetylthioethylthio) - 17α - ethynyl - 17β-acetoxyestra-3,5-diene.

14. 3 - (β - acetylthioethylthio) - 17α - methyl - 17β - acetoxyandrost-3,5-diene.

15. 3β - acetoxy - 6 - methyl - 17 - (β - acetylthioethylthio) androsta-5,16-diene.

16. 3 - (β - acetylthioethylthio) - 17β - acetoxyandrost-(5α)-2-ene.

17. 3β - acetoxy - 20 - (β - acetylthioethylthio) pregna-5,17(20)-diene.

No references cited.

ELBERT L. ROBERTS, *Primary Examiner.*

U.S. Cl. X.R.

260—397.4, 397.5, 455, 397.2

UNITED STATES PATENT OFFICE
CERTIFICATE OF CORRECTION

Patent No. 3,427,330                                                    February 11, 1969

George Karmas

It is certified that error appears in the above identified patent and that said Letters Patent are hereby corrected as shown below:

Column 3, line 73, "33" should read -- 3 --. Column 4, line 5, "1.0" should read -- 1.0 g --; line 24, "progesterones" should read -- progesterone --; line 54, "2" should read -- 20 --. Column 6, line 1, "117" should read -- 17 --; line 24, "20" should read -- 2.0 --. Column 8, line 29, "acylthio-alylthioenol" should read -- acylthioalkylthioenol --.

Signed and sealed this 24th day of March 1970.

(SEAL)
Attest:

Edward M. Fletcher, Jr.                             WILLIAM E. SCHUYLER, JR.
Attesting Officer                                               Commissioner of Patents